United States Patent
Morozov et al.

(10) Patent No.: US 11,610,323 B2
(45) Date of Patent: Mar. 21, 2023

(54) DEPTH SENSING APPARATUS AND OPERATING METHOD OF DEPTH SENSING APPARATUS

(71) Applicant: Samsung Electronics Co., Ltd., Suwon-si (KR)

(72) Inventors: Kostiantyn Morozov, Kyiv (UA); Dmytro Korba, Kyiv (UA); Ruslan Iermolenko, Kyiv (UA); Andrii Sukhariev, Vinnytsia (UA); Serhii Iliukhin, Kyiv (UA); Andrii But, Kyiv (UA); Ivan Safonov, Kharkov (UA); Yaroslav Lavrenyuk, Kyiv (UA); Oleksandr Klimenkov, Kyiv (UA); Dmytro Vavdiiuk, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 17/269,225

(22) PCT Filed: Jul. 1, 2019

(86) PCT No.: PCT/KR2019/007957
§ 371 (c)(1),
(2) Date: Feb. 17, 2021

(87) PCT Pub. No.: WO2020/036309
PCT Pub. Date: Feb. 20, 2020

(65) Prior Publication Data
US 2021/0327079 A1   Oct. 21, 2021

(30) Foreign Application Priority Data
Aug. 17, 2018   (KR) .......................... 10-2018-0096123

(51) Int. Cl.
*G06T 7/521* (2017.01)
*G06T 7/55* (2017.01)

(52) U.S. Cl.
CPC ................ *G06T 7/521* (2017.01); *G06T 7/55* (2017.01)

(58) Field of Classification Search
CPC . G06T 7/521; G06T 7/55; G06T 2207/30208; G06T 5/00; H04N 13/254
See application file for complete search history.

(56) References Cited

U.S. PATENT DOCUMENTS 9,955,141 B2   4/2018   Lu et al.
10,341,633 B2   7/2019   Lindner et al.
(Continued)

FOREIGN PATENT DOCUMENTS

| JP | 2015-210271 A | 11/2015 |
| KR | 10-2015-0090685 A | 8/2015 |
| KR | 10-2018-0084805 A | 7/2018 |

OTHER PUBLICATIONS

Translation of the Written Opinion of the International Searching Authority dated Oct. 14, 2019 in connection with International Application No. PCT/KR2019/007957, 5 pages.
(Continued)

*Primary Examiner* — Matthew C Bella
*Assistant Examiner* — Kathleen M Broughton

(57) ABSTRACT

A synchronization method of a first depth sensing apparatus includes: transmitting a first optical signal to measure a distance to an object; receiving the first optical signal reflected by the object; when recognition of the received first optical signal fails, stopping transmission of the first optical signal and generating first synchronization information for synchronization with at least one second depth sensing apparatus; receiving a third optical signal for synchronization with the first depth sensing apparatus, which is trans-
(Continued)

mitted by the at least one second depth sensing apparatus, and decoding the received third optical signal to extract at least one piece of second synchronization information; determining a time point at which and a cycle in which to re-transmit the first optical signal, based on the first synchronization information and the at least one piece of second synchronization information; and re-transmitting the first optical signal at the determined time point and cycle.

14 Claims, 15 Drawing Sheets

(56) References Cited

U.S. PATENT DOCUMENTS

| | | |
|---|---|---|
| 2015/0161818 A1 | 6/2015 | Komenczi et al. |
| 2015/0312552 A1 | 10/2015 | Lu et al. |
| 2015/0373322 A1 | 12/2015 | Goma et al. |
| 2016/0349369 A1 | 12/2016 | Lee |
| 2017/0148168 A1 | 5/2017 | Lindner et al. |
| 2017/0188019 A1 | 6/2017 | Kashyap |
| 2018/0176541 A1 | 6/2018 | Abbas et al. |
| 2020/0408915 A1 | 12/2020 | Lee et al. |

OTHER PUBLICATIONS

International Search Report and Written Opinion of the International Searching Authority in connection with International Application No. PCT/KR2019/007957 dated Oct. 14, 2019, 9 pages.

FIG. 7B
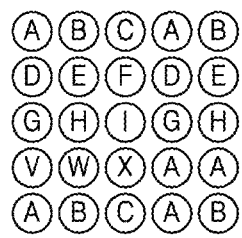
740
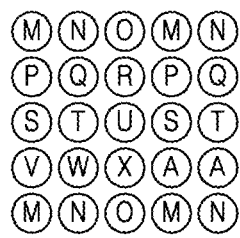
750
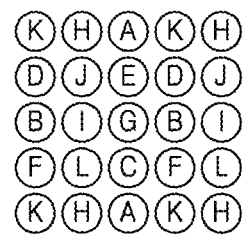
760

DEPTH SENSING APPARATUS AND OPERATING METHOD OF DEPTH SENSING APPARATUS

CROSS-REFERENCE TO RELATED APPLICATIONS

This application is a 371 National Stage of International Application No. PCT/KR2019/007957, filed Jul. 1, 2019, which claims priority to Korean Patent Application No. 10-2018-0096123, filed Aug. 17, 2018, the disclosures of which are herein incorporated by reference in their entirety.

BACKGROUND

1. Field

The disclosure relates to a depth sensing apparatus and an operation method of the depth sensing apparatus.

2. Description of Related Art

Embodiments of the disclosure provide a depth sensing apparatus and an operation method of the depth sensing apparatus.

SUMMARY

Recently, three-dimensional (3D) content that can give users a sense of depth and a sense of immersion has been in the spotlight in many fields such as games, education, and cultural industries. Because the quality of 3D content is greatly influenced by depth information, a process of obtaining accurate depth information and improving the quality of the depth information is important. Because 3D content can be obtained using a depth sensing apparatus, the performance of the depth sensing apparatus can determine the quality of the 3D content.

Embodiments of the disclosure provide a depth sensing apparatus and an operation method of the depth sensing apparatus.

BRIEF DESCRIPTION OF THE DRAWINGS

FIG. 7B is a diagram illustrating an embodiment in which a first depth sensing apparatus according to an embodiment of the disclosure transmits a second optical signal obtained by encoding first synchronization information;

DETAILED DESCRIPTION

Figure 1:
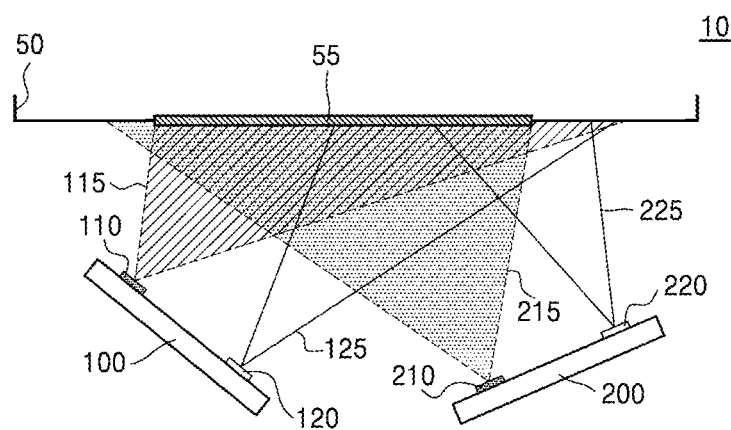
FIG. 1 is a schematic diagram for explaining a synchronization system of depth sensing apparatuses, according to an embodiment of the disclosure.

According to an embodiment of the disclosure, a synchronization method of a first depth sensing apparatus includes transmitting a first optical signal in order to measure a distance to an object; receiving the first optical signal reflected by the object; when recognition of the received first optical signal fails, stopping transmission of the first optical signal and generating first synchronization information for synchronization with at least one second depth sensing apparatus; receiving a third optical signal for synchronization with the first depth sensing apparatus, which is transmitted by the at least one second depth sensing apparatus, and decoding the received third optical signal to extract at least one piece of second synchronization information; determining a time point at which and a cycle in which to re-transmit the first optical signal, based on the first synchronization information and the at least one piece of second synchronization information, and re-transmitting the first optical signal at the determined time point and cycle.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the examples set forth herein. In the drawings, parts irrelevant to the description are omitted for simplicity of explanation, and like numbers refer to like elements throughout.

Although general terms widely used at present were selected for describing the disclosure in consideration of the functions thereof, these general terms may vary according to intentions of one of ordinary skill in the art, case precedents, the advent of new technologies, and the like. Hence, the terms must be defined based on their meanings and the contents of the entire specification, not by simply stating the terms.

While such terms as "first," "second," etc., may be used to describe various components, such components must not be limited to the above terms. The above terms are used only to distinguish one component from another.

The terms used in the present specification are merely used to describe particular embodiments, and are not intended to limit the scope of the disclosure. An expression used in the singular encompasses the expression of the plural, unless it has a clearly different meaning in the context. Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this disclosure, specify the presence of stated elements, but do not preclude the presence or addition of one or more other elements.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. Embodiments of the disclosure are not limited to the described order of the operations.

Thus, the expression "according to an embodiment" used in the entire disclosure does not necessarily indicate the same embodiment.

Embodiments of the present disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein could employ any number of conventional techniques for electronics configuration, signal processing and/or control, data processing and the like. The words "mechanism," "element," "means," and "configuration" are used broadly and are not limited to mechanical or physical embodiments, Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

A depth sensing apparatus according to an embodiment of the disclosure obtain depth information of an object by photographing the object, and generates a three-dimensional (3D) image, based on the obtained depth information. The depth sensing apparatus may use technology of measuring a distance between a camera and an object by using an optical signal such as infrared light.

The disclosure will now be described more fully with reference to the accompanying drawings, in which exemplary embodiments are shown.

FIG. 1 is a schematic diagram of a synchronization system of depth sensing apparatuses according to an embodiment of the disclosure.

A synchronization system 10 of depth sensing apparatuses according to an embodiment of the disclosure may include a first depth sensing apparatus 100 and a second depth sensing apparatus 200. The first depth sensing apparatus 100 may generate a 3D image of an object by photographing the object. The second depth sensing apparatus 200 may be at least one second depth sensing apparatus. A description of the first depth sensing apparatus 100 is equally applicable to the second depth sensing apparatus 200. For convenience of explanation, the first depth sensing apparatus 100 will now be focused on and described.

The first depth sensing apparatus 100 according to an embodiment of the disclosure may include a first transmitter 110 and a first receiver 120. The first depth sensing apparatus 100 may include a processor (not shown), and an operation of the first depth sensing apparatus 100 which will now be described may be controlled by the processor. A memory (not shown) according to an embodiment of the disclosure may store one or more instructions. The processor may execute the one or more instructions stored in the memory. Accordingly, the processor may control the operation of the first depth sensing apparatus 100. The processor may control operations of the devices included in the first depth sensing apparatus 100.

The first transmitter 110 according to an embodiment of the disclosure may be a device that transmits an optical signal. The first transmitter 110 may be, but is not limited to, a laser, an illuminator, or a projector. The first transmitter 110 may transmit an optical signal of infrared light, but the optical signal is not limited to only infrared light. A first transmission region 115 of FIG. 1 is an example of a region to which the first transmitter 110 may transmit the optical signal.

The first receiver 120 according to an embodiment of the disclosure may be a device that receives an optical signal. The first receiver 120 may be, but is not limited to, a photo sensor. The first receiver 120 may receive an optical signal reflected by the object. The first receiver 120 may receive the optical signal transmitted by the first transmitter 110, and may also receive an optical signal transmitted by another depth sensing apparatus. A first reception region 125 of FIG. 1 is an example of a region from which the first receiver 120 may receive the optical signal.

The first transmission region 115 and the first reception region 125 may be the same as each other or different from each other according to operations of the first transmitter 110 and the first receiver 120. Although FIG. 1 illustrates a case where the first transmission region 115 and the first reception region 125 are different from each other, embodiments of the disclosure are not limited thereto. The first transmission region 115 and the first reception region 125 may be the same as each other.

The first depth sensing apparatus 100 according to an embodiment of the disclosure may generate a depth image of an object 50 by photographing the object 50. In detail, the first transmitter 110 may transmit the optical signal to the object 50. The transmitted optical signal may be reflected by a surface of the object 50, and the reflected optical signal may be received by the first receiver 120.

When a plurality of optical signals are transmitted, even when the plurality of optical signals are transmitted simultaneously, time points when reflected optical signals are received by the first receiver 120 may be different according to the surface of the object 50. The processor of the first depth sensing apparatus 100 according to an embodiment of the disclosure may generate depth information of the object 50 through a received first optical signal, and may generate a 3D depth image of the object 50, based on the generated depth information.

The second depth sensing apparatus 200 according to an embodiment of the disclosure may include a second transmitter 210 and a second receiver 220. The above description of the first transmitter 110 and the second receiver 120 is equally applicable to the second transmitter 210 and the second receiver 220. The above description of the first transmission region 115 and the first reception region 125 is equally applicable to a second transmission region 215 and a second reception region 225.

FIG. 1 according to an embodiment of the disclosure illustrates an example of a collision region 55 where the first transmission region 115 and the second transmission region 215 overlap each other. The collision region 55 may refer to a region where the first transmission region 115 and the second transmission region 215 overlap each other because an optical signal transmitted by the first depth sensing apparatus 100 through the first transmitter 110 and an optical signal transmitted by the second depth sensing apparatus 200 through the second transmitter 210 are transmitted at the same time point to the same location.

When the first transmission region 115 and the second transmission region 215 overlap with each other, the first receiver 120 may recognize not only the optical signal transmitted by the first transmitter 110 but also the optical signal transmitted by the second transmitter 210, and thus may not accurately recognize the optical signal transmitted by the first transmitter 110. Alternatively, when the first transmission region 115 and the second transmission region 215 overlap each other, a plurality of optical signals are projected to the object 50 in a form where the plurality of optical signals collide with one another, and thus the first receiver 120 may not accurately recognize both the optical signal transmitted by the first transmitter 110 and the optical signal transmitted by the second transmitter 210. Accordingly, the first depth sensing apparatus 100 and the second depth sensing apparatus 200 need to determine an order of transmitting optical signals in order to avoid mutual collision, by synchronizing with each other. In detail, when the first depth sensing apparatus 100 and the second depth sensing apparatus 200 determine a time point when and a cycle during which to transmit optical signals by synchronizing with each other, the first depth sensing apparatus 100 and the second depth sensing apparatus 200 may perform a depth sensing operation without the above-described collision.

The first depth sensing apparatus 100 may synchronize with the second depth sensing apparatus 200 by using the first transmitter 110 and the first receiver 120. The first depth sensing apparatus 100 may project an optical signal obtained by encoding synchronization information to the object 50 through the first transmitter 110. In an encoding operation of the first depth sensing apparatus 100, the first depth sensing apparatus 100 may convert the synchronization information into predetermined information and then project the predetermined information as an optical signal.

Alternatively, the first depth sensing apparatus 100 may encode the synchronization information into a second optical signal according to a method of transmitting the synchronization information as the second optical signal. As will be described later, the first depth sensing apparatus 100 may transmit the second optical signal in the form of different images according to the synchronization information. The second optical signal may be transmitted in a form of projecting a predetermined image to an object. When the synchronization information is first information, the first depth sensing apparatus 100 may encode the synchronization information into the second optical signal to project a first image corresponding to the first information. When the synchronization information is second information, the first depth sensing apparatus 100 may encode the synchronization information into the second optical signal to project a second image corresponding to the second information.

The second depth sensing apparatus 200 may obtain synchronization information by receiving the projected optical signal through the second receiver 220 and decoding an encoded optical signal. The first depth sensing apparatus 100 and the second depth sensing apparatus 200 may operate at the determined time point when and cycle in which to transmit an optical signal according to the synchronization information. Accordingly, the first depth sensing apparatus 100 and the second depth sensing apparatus 200 may perform depth sensing operations without the above-described collision.

Figure 2:
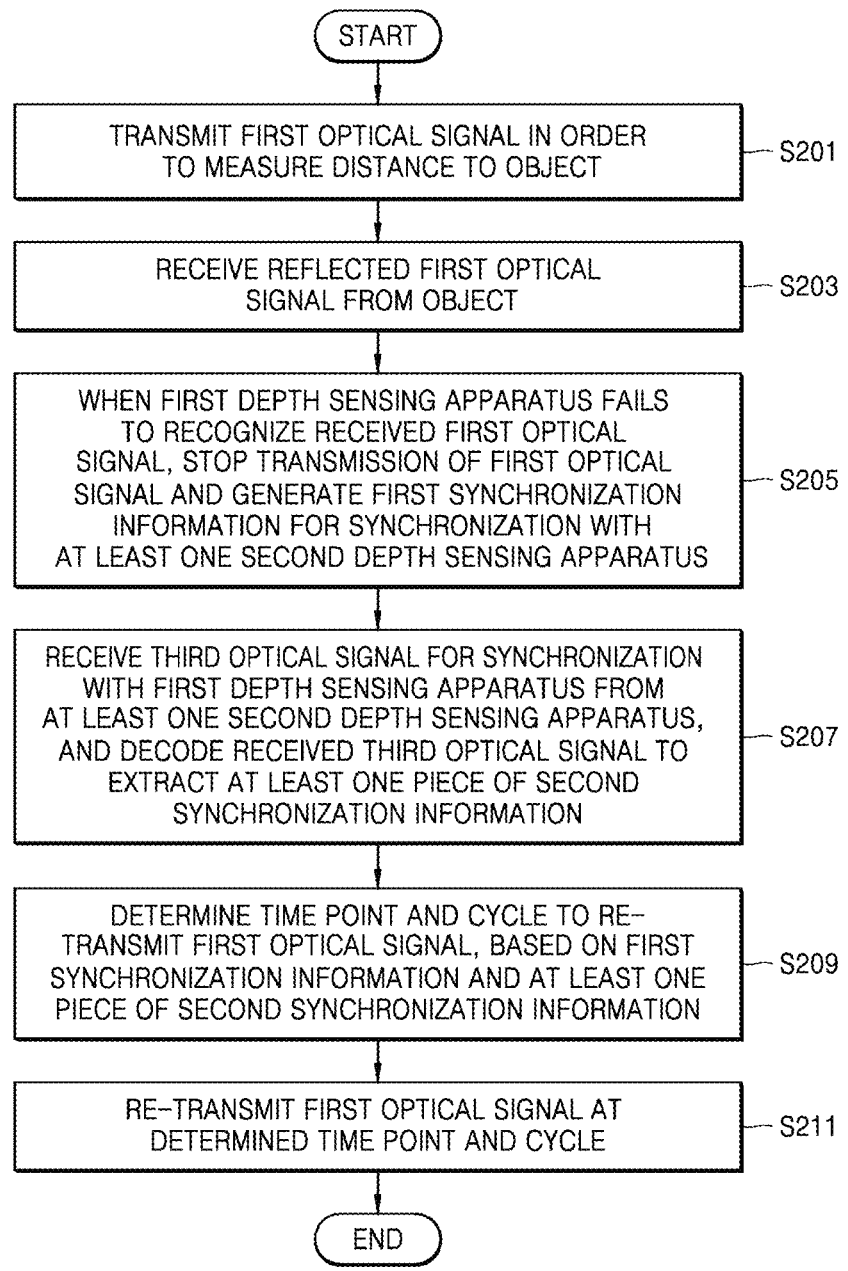
FIG. 2 is a flowchart of a synchronization method of depth sensing apparatuses according to an embodiment of the disclosure.

FIG. 2 is a flowchart of a synchronization method of depth sensing apparatuses according to an embodiment of the disclosure.

In operation S201, the first depth sensing apparatus 100 according to an embodiment of the disclosure may transmit a first optical signal in order to measure a distance to the object 50. The first optical signal may be, but is not limited to, infrared light. Optical signals easy to measure the distance to the object 50 may be examples of the first optical signal.

In operation S203, the first depth sensing apparatus 100 according to an embodiment of the disclosure may receive a reflected first optical signal from the object 50. Operations S201 and S203 may be a depth sensing mode of the first depth sensing apparatus 100. The depth sensing mode, which is an operation, performed by the first depth sensing apparatus 100, of generating a depth image of the object 50 by photographing the object 50, may refer to a general operation of the first depth sensing apparatus 100.

In operation S205, when the first depth sensing apparatus 100 according to an embodiment of the disclosure fails to recognize the received first optical signal, the first depth sensing apparatus 100 may interrupt transmission of the first optical signal and may generate first synchronization information for synchronization with the at least one second depth sensing apparatus 200. In detail, when the first depth sensing apparatus 100 fails to recognize the received first optical signal, the first depth sensing apparatus 100 may switch from the depth sensing mode into a synchronization mode. The synchronization mode may refer to an operation of determining an order to transmit an optical signal in order to avoid collision with another depth sensing apparatus, when the first receiver 120 fails to recognize the optical signal transmitted by the first transmitter 110. The first depth sensing apparatus 100 may stop transmission of the first optical signal according to the synchronization mode. The first depth sensing apparatus 100 may generate first synchronization information for synchronization with the second depth sensing apparatus 200. As described above, the second depth sensing apparatus 200 may be at least one second depth sensing apparatus.

The first depth sensing apparatus 100 according to an embodiment of the disclosure may encode the first synchronization information and may transmit a second optical signal corresponding to a result of encoding the first synchronization information. Encoding the first synchronization information may be changing the transmission intensity of the second optical signal according to the time, or may be transmitting the second optical signal to the object 50 in a form of projecting a predetermined image. In detail, the first depth sensing apparatus 100 may transmit the second optical signal to the object 50 in a form of changing the transmission intensity according to the time. Alternatively, the first depth sensing apparatus 100 may transmit the second optical signal to the object 50 in the form of projecting a predetermined image.

In operation S207, the first depth sensing apparatus 100 according to an embodiment of the disclosure may receive a third optical signal for synchronization with the first depth sensing apparatus 100 from the at least one second depth sensing apparatus 200, and may decode the received third optical signal to extract at least one piece of second synchronization information.

In operation S209, the first depth sensing apparatus 100 according to an embodiment of the disclosure may determine a time point when and a cycle during which to re-transmit the first optical signal, based on the first synchronization information and the at least one piece of second synchronization information. In detail, the time point when and the cycle during which to re-transmit the first optical signal may be determined according to a predetermined rule or may be determined by a master device determined according to a predetermined master determination rule.

In operation S211, the first depth sensing apparatus 100 according to an embodiment of the disclosure may re-transmit the first optical signal at the determined time point and cycle. When re-transmitting the first optical signal at the determined time point and cycle, the first depth sensing apparatus 100 may perform a depth sensing operation without collision with the at least one second depth sensing apparatus 200.

The first depth sensing apparatus 100 according to an embodiment of the disclosure may perform the depth sensing mode and the synchronization mode at the same time. For example, after synchronizing with the at least one second depth sensing apparatus 200 through the synchronization mode, the first depth sensing apparatus 100 may transmit the second optical signal obtained by encoding the first synchronization information, and thus transmit the first synchronization information to the at least one second depth sensing apparatus 200, while operating in the depth sensing mode.

Figure 3:
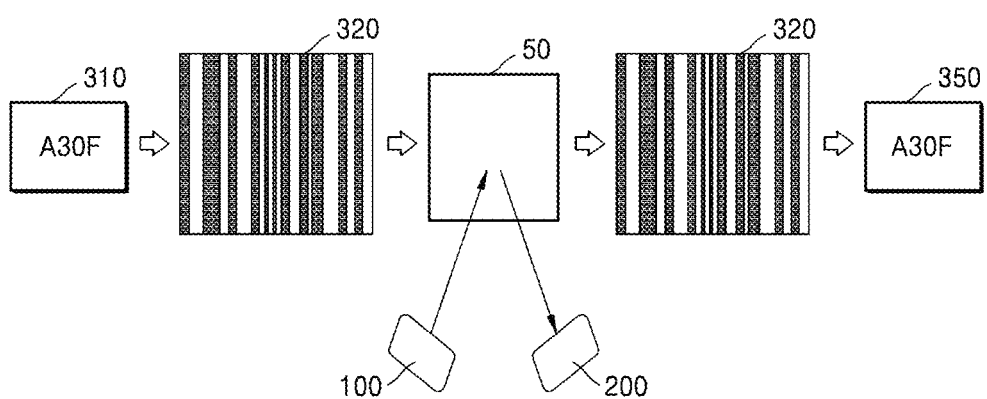
FIG. 3 is a schematic diagram for explaining a synchronization process of a first depth sensing apparatus according to an embodiment of the disclosure.

FIG. 3 is a schematic diagram of a synchronization process of a first depth sensing apparatus according to an embodiment of the disclosure.

The first depth sensing apparatus 100 according to an embodiment of the disclosure may encode first synchronization information 310 in the synchronization mode. The first synchronization information 310 may be, for example, "A30F" expressed in a hexadecimal form. However, this is merely an example, and the encoded first synchronization information 310 may be expressed in a binary form as will be described later, and the format of the encoded first synchronization information 310 may vary. The first synchronization information 310 encoded as "A30F" may be information about the time point at which and the cycle during which the first depth sensing apparatus 100 and the second depth sensing apparatus 200 are to transmit an optical signal.

The first depth sensing apparatus 100 according to an embodiment of the disclosure may transmit a second optical signal 320 obtained by encoding the first synchronization information 310. Encoding the first synchronization information 310 may be changing the transmission intensity of the second optical signal 320 according to the time, or may be transmitting the second optical signal 320 to the object 50 in a form of projecting a predetermined image. In detail, the first depth sensing apparatus 100 may transmit the second optical signal 320 to the object 50 in a form of changing the transmission intensity according to the time. Alternatively, the first depth sensing apparatus 100 may transmit the second optical signal 320 to the object 50 in the form of projecting a predetermined image.

The second depth sensing apparatus 200 according to an embodiment of the disclosure may receive a second optical signal 340 projected to the object 50. The second depth sensing apparatus 200 may generate first synchronization information 350 by decoding the received second optical signal 340. The second depth sensing apparatus 200 may determine the time point when and the cycle during which to transmit an optical signal, based on the first synchronization information 350.

Figure 4:
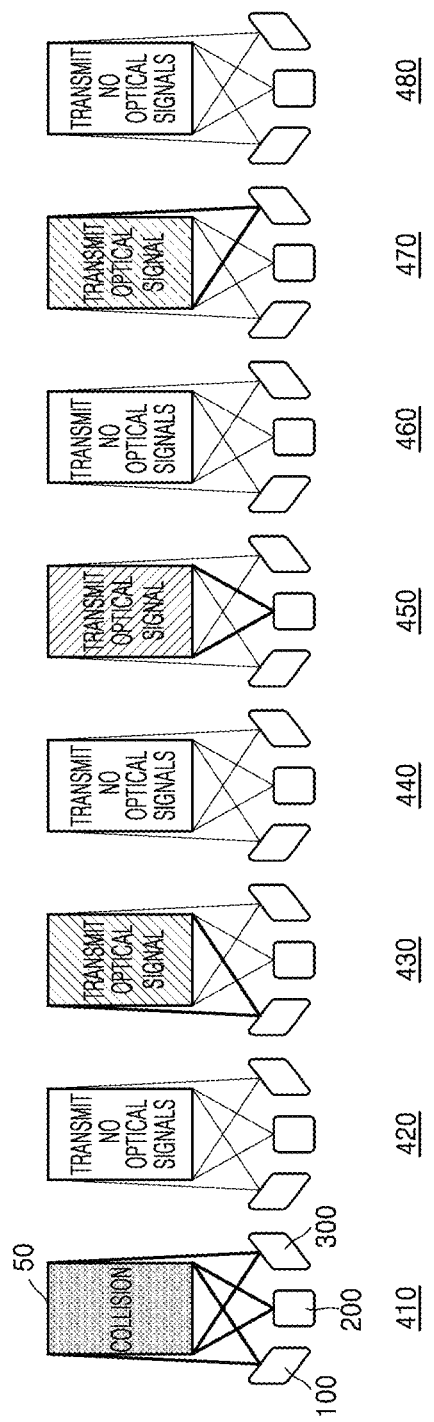
FIG. 4 is a schematic diagram for explaining a synchronization process of a first depth sensing apparatus according to an embodiment of the disclosure.

FIG. 4 is a schematic diagram illustrating a synchronization process of a first depth sensing apparatus according to an embodiment of the disclosure.

According to an embodiment of the disclosure, the first depth sensing apparatus 100 may stop an operation of transmitting a first optical signal for measuring a distance to an object in the synchronization mode, and may receive a third optical signal transmitted by the second depth sensing apparatus 200. The third optical signal, which is transmitted by the at least one second depth sensing apparatus 200, may be a signal for synchronization with the first depth sensing apparatus 100.

The first depth sensing apparatus 100 may perform the synchronization mode only until a predetermined time after a time point of switching to the synchronization mode. In detail, when a time point when the first depth sensing apparatus 100 fails to recognize the received first optical signal is t1, the first depth sensing apparatus 100 may switch to the synchronization mode at the time point t1, and may maintain the synchronization mode until a time point t2 which is after a predetermined time period from the time point t1. Accordingly, a synchronization mode section may be t1~t2, and, during the synchronization mode section (t1~t2), the first depth sensing apparatus 100 may receive the third optical signal. When synchronization is failed even when the first depth sensing apparatus 100 performs a synchronization mode operation during the synchronization mode section (t1~t2), the first depth sensing apparatus 100 may perform the synchronization mode operation again.

The cycle during which to re-transmit the first optical signal may be determined based on the number of at least one piece of second synchronization information. In detail, the cycle during which to re-transmit the first optical signal may be a result of dividing a predetermined re-transmission period by the number of first synchronization information and at least one piece of second synchronization information. For example, when the number of at least one second depth sensing apparatus 200 is one, the number of at least one piece of second synchronization information may also be one. When the predetermined re-transmission period is 90 ms, a value of 45 ms obtained by dividing 90 ms by a sum of the number of first synchronization information and the number of at least one piece of second synchronization information, which is 2, may be calculated as the re-transmission cycle. As another example, when the number of at least one second depth sensing apparatus 200 is two, the number of at least one piece of second synchronization information may also be two. When the predetermined re-transmission period is 90 ms, a value of 30 ms obtained by dividing 90 ms by a sum of the number of first synchronization information and the number of at least one piece of second synchronization information, which is three, may be calculated as the re-transmission cycle.

The first depth sensing apparatus 100 may determine the time point when to re-transmit the first optical signal, by comparing a time point when the second optical signal has been transmitted and a time point when the third optical signal has been received. In detail, when the first depth sensing apparatus 100 has received no third optical signals, based on the time point when the second optical signal has been transmitted, the first depth sensing apparatus 100 may determine the time point when to re-transmit the first optical signal as a first time point. When the first depth sensing apparatus 100 has received a third optical signal, based on the time point when the second optical signal has been transmitted, the first depth sensing apparatus 100 may determine the time point when to re-transmit the first optical signal as a second time point.

In operation 410, collision may occur between optical signals during respective depth sensing operations of the first depth sensing apparatus 100, the second depth sensing apparatus 200, and a third depth sensing apparatus 300 according to an embodiment of the disclosure. The third depth sensing apparatus 300 may be one of the at least one second depth sensing apparatus 200.

In operation 420, the first depth sensing apparatus 100, the second depth sensing apparatus 200, and the third depth sensing apparatus 300 according to an embodiment of the disclosure may stop the depth sensing mode and may switch to the synchronization mode. The first depth sensing apparatus 100, the second depth sensing apparatus 200, and the third depth sensing apparatus 300 may stop an operation of transmitting an optical signal, according to the synchronization mode. A time point when the first depth sensing apparatus 100 is to transmit the second optical signal obtained by encoding the first synchronization information may be randomly determined. Likewise, as for the second depth sensing apparatus 200 and the third depth sensing apparatus 300, a time point when to transmit an optical signal obtained by encoding synchronization information may be randomly determined.

In operation 430, the first depth sensing apparatus 100 according to an embodiment of the disclosure may transmit the second optical signal at an earlier time point than the second depth sensing apparatus 200 and the third depth sensing apparatus 300. Accordingly, a time point when the first depth sensing apparatus 100 is to start re-transmission of the first optical signal for depth sensing may be earlier than the second depth sensing apparatus 200 and the third depth sensing apparatus 300. The second depth sensing apparatus 200 and the third depth sensing apparatus 300 may receive the second optical signal and may know the time point at which and the cycle during which the first optical signal is to be re-transmitted.

In operation 440, the first depth sensing apparatus 100, the second depth sensing apparatus 200, and the third depth sensing apparatus 300 according to an embodiment of the disclosure may stop an operation of transmitting an optical signal. Operation 440 includes operations of the first depth sensing apparatus 100, the second depth sensing apparatus 200, and the third depth sensing apparatus 300 performed before the second depth sensing apparatus 200 transmits an optical signal obtained by encoding the synchronization information in operation 450.

In operation 450, the second depth sensing apparatus 200 according to an embodiment of the disclosure may secondly transmit an optical signal obtained by encoding the second synchronization information. Accordingly, a time point when the second depth sensing apparatus 200 is to start re-transmission of an optical signal for depth sensing may be earlier than the third depth sensing apparatus 300 but may be later than the first depth sensing apparatus 100. The first depth sensing apparatus 100 and the third depth sensing apparatus 300 may receive the optical signal obtained by encoding the second synchronization information, and may know the time point at which and the cycle during which the second depth sensing apparatus 200 is to re-transmit the optical signal for depth sensing.

In operation 460, the first depth sensing apparatus 100, the second depth sensing apparatus 200, and the third depth sensing apparatus 300 according to an embodiment of the disclosure may stop an operation of transmitting an optical signal. Operation 460 includes operations of the first depth sensing apparatus 100, the second depth sensing apparatus 200, and the third depth sensing apparatus 300 performed before the third depth sensing apparatus 300 transmits an optical signal obtained by encoding the synchronization information in operation 470.

In operation 470, the third depth sensing apparatus 300 according to an embodiment of the disclosure may thirdly transmit an optical signal obtained by encoding the synchronization information. Accordingly, a time point when the third depth sensing apparatus 300 is to start re-transmission of the optical signal for depth sensing may be later than the second depth sensing apparatus 100 and the second depth sensing apparatus 200. The first depth sensing apparatus 100 and the second depth sensing apparatus 200 may receive the optical signal obtained by encoding the synchronization information, and may know the time point at which and the cycle during which the third depth sensing apparatus 300 is to re-transmit the optical signal for depth sensing.

In operation 480, the first depth sensing apparatus 100, the second depth sensing apparatus 200, and the third depth sensing apparatus 300 according to an embodiment of the disclosure may stop an operation of transmitting an optical signal. Operation 480 may include operations of the first depth sensing apparatus 100, the second depth sensing apparatus 200, and the third depth sensing apparatus 300 before the first depth sensing apparatus 100, the second depth sensing apparatus 200, and the third depth sensing apparatus 300 perform an operation of re-transmitting an optical signal at the determined time point and cycle according to the depth sensing mode.

Figure 5:
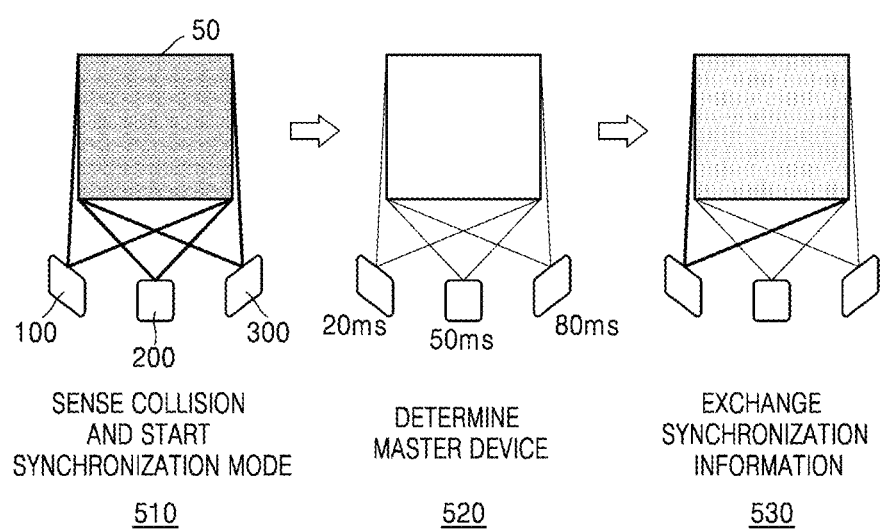
FIG. 5 is a schematic diagram for explaining a method of synchronization through a master device among synchronization processes of a first depth sensing apparatus according to an embodiment of the disclosure.

FIG. 5 is a schematic diagram illustrating a synchronization method through a master device within a synchronization process of a first depth sensing apparatus according to an embodiment of the disclosure.

According to an embodiment of the disclosure, determining the time point at which and the cycle during which the first depth sensing apparatus 100 is to re-transmit the first optical signal may be determining the time point when and the cycle during which to re-transmit the first optical signal, based on third synchronization information transmitted by the master device. The master device may be determined based on the third synchronization information transmitted by a master device determined from among the first depth sensing apparatus 100 and the at least one second depth sensing apparatus 200 according to a predetermined master determination rule. In detail, the predetermined master determination rule may be a rule in which the first depth sensing apparatus 100 is determined as the master device when the time point at which the second optical signal has been transmitted is earlier than the time point at which the third optical signal has been received. The third synchronization information may be information about the time point at which and the cycle during which the first depth sensing apparatus 100 and the at least one second depth sensing apparatus 200 are to re-transmit an optical signal.

The cycle during which the master device is to re-transmit an optical signal for depth sensing may be determined based on the number of at least one piece of second synchronization information. For example, when the master device is assumed to be the first depth sensing apparatus 100, the cycle during which to re-transmit the first optical signal may be a result of dividing a predetermined re-transmission period by the number of first synchronization information and at least one piece of second synchronization information. For example, when the number of at least one second depth sensing apparatus 200 is one, the number of at least one piece of second synchronization information may also be one. When the predetermined re-transmission period is 90 ms, a value of 45 ms obtained by dividing 90 ms by a sum of the number of first synchronization information and the number of at least one piece of second synchronization information, which is 2, may be the re-transmission cycle. As another example, when the number of at least one second depth sensing apparatus 200 is two, the number of at least one piece of second synchronization information may also be two. When the predetermined re-transmission period is 90 ms, a value of 30 ms obtained by dividing 90 ms by a sum of the number of first synchronization information and the number of at least one piece of second synchronization information, which is 3, may be the re-transmission cycle.

In operation 510, collision may occur between optical signals during respective depth sensing operations of the first depth sensing apparatus 100, the second depth sensing apparatus 200, and the third depth sensing apparatus 300 according to an embodiment of the disclosure. The third depth sensing apparatus 300 may be one of the at least one second depth sensing apparatus 200.

In operation 520, the first depth sensing apparatus 100, the second depth sensing apparatus 200, and the third depth sensing apparatus 300 according to an embodiment of the disclosure may stop the depth sensing mode and may switch to the synchronization mode. The first depth sensing apparatus 100, the second depth sensing apparatus 200, and the third depth sensing apparatus 300 may stop an operation of transmitting an optical signal, according to the synchronization mode. A time point when the first depth sensing apparatus 100 is to transmit the second optical signal obtained by encoding the first synchronization information may be randomly determined. Likewise, as for the second depth sensing apparatus 200 and the third depth sensing apparatus 300, a time point when to transmit an optical signal obtained by encoding synchronization information may be randomly determined.

20 ms after switching to the synchronization mode, the first depth sensing apparatus 100 may transmit an optical signal obtained by encoding synchronization information, and after 50 ms and 80 ms respectively, the second depth sensing apparatus 200 and the third depth sensing apparatus 300 may transmit an optical signal obtained by encoding synchronization information. Because the first depth sensing apparatus 100 has transmitted the optical signal obtained by encoding synchronization information at an earlier time point than the second depth sensing apparatus 200 and the third depth sensing apparatus 300, the first depth sensing apparatus 100 may be determined as a master device according to the predetermined master determination rule.

In operation 530, according to an embodiment of the disclosure, the first depth sensing apparatus 100 determined as a master device may generate the third synchronization information by determining the time point at which and the cycle during which each of the first depth sensing apparatus 100, the second depth sensing apparatus 200, and the third depth sensing apparatus 300 is to re-transmit the optical signal. The first depth sensing apparatus 100 may encode the generated third synchronization information and transmit the encoded third synchronization information as an optical signal. The second depth sensing apparatus 200 and the third depth sensing apparatus 300 may receive the optical signal obtained by encoding the third synchronization information, and transmit optical signals for the depth sensing mode according to the determined time points when and cycles during which to re-transmit the optical signal.

Figure 6A:
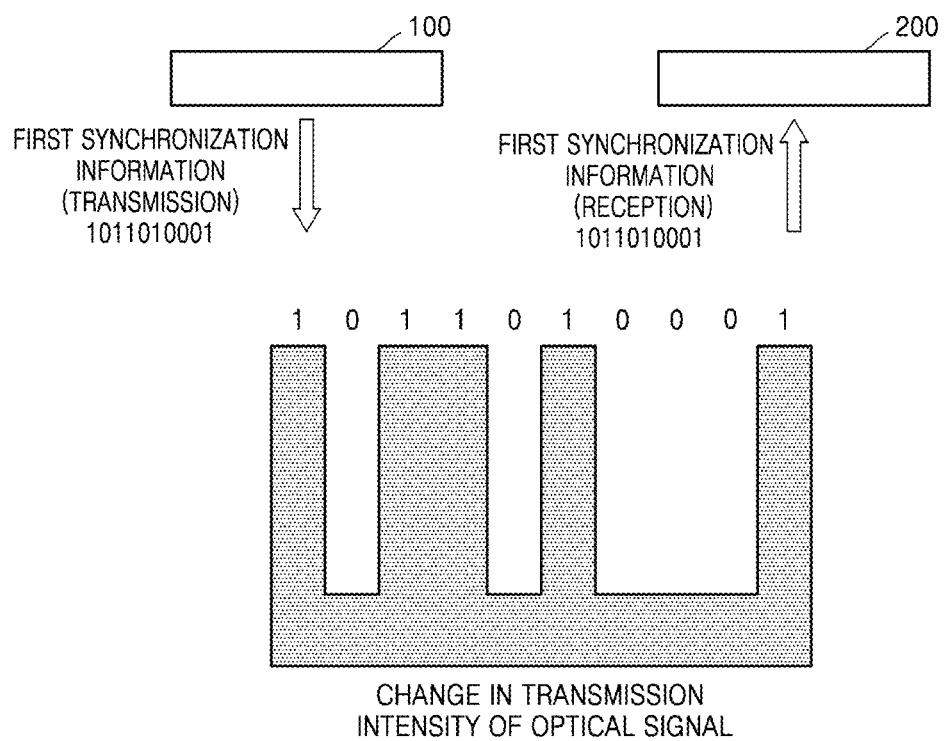
FIG. 6A is a diagram illustrating an embodiment in which a first depth sensing apparatus according to an embodiment of the disclosure transmits a second optical signal obtained by encoding first synchronization information.

FIG. 6A is a diagram illustrating an embodiment in which a first depth sensing apparatus according to an embodiment of the disclosure transmits the second optical signal obtained by encoding the first synchronization information.

The first depth sensing apparatus 100 according to an embodiment of the disclosure may transmit the second optical signal obtained by encoding the first synchronization information. In detail, the first depth sensing apparatus 100 may transmit the second optical signal to the object 50 by changing the transmission intensity of the second optical signal according to the time.

According to an embodiment of the disclosure, when the transmission intensity of the second optical signal is greater than or equal to a predetermined value during a predetermined time period, first synchronization information corresponding to the case may have a bit of 1. When the transmission intensity of the second optical signal is less than the predetermined value during the predetermined time period, first synchronization information corresponding to the case may have a bit of 0. For example, when the predetermined time period is 1 ms and the first depth sensing apparatus 100 transmits the second optical signal in a transmission intensity equal to or greater than a predetermined value from 0 ms to 1 ms, first synchronization information corresponding to the case may have a bit of 1. When the first depth sensing apparatus 100 transmits a transmission intensity of the second optical signal that is less than the predetermined value from 1 ms to 2 ms, first synchronization information corresponding to the case may have a bit of 0. Accordingly, the first synchronization information generated from 0 ms to 2 ms may have a bit value of "10".

In the same manner as above, as shown in FIG. 6A, the first depth sensing apparatus 100 may transmit first synchronization information of "1011010001" to the at least one second depth sensing apparatus 200 by adjusting the transmission intensity of the second optical signal during the predetermined time period.

Figure 6B:
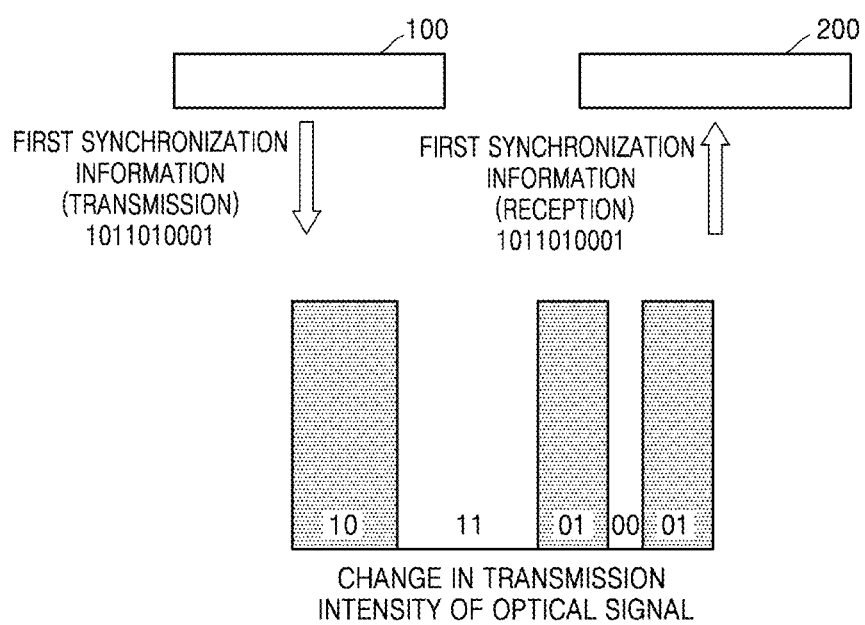
FIG. 6B is a diagram illustrating an embodiment in which a first depth sensing apparatus according to an embodiment of the disclosure transmits a second optical signal obtained by encoding first synchronization information.

FIG. 6B is a diagram illustrating an embodiment in which a first depth sensing apparatus according to an embodiment of the disclosure transmits the second optical signal obtained by encoding the first synchronization information.

According to an embodiment of the disclosure, the first depth sensing apparatus 100 may transmit the second optical signal obtained by encoding the first synchronization information, through the transmission intensity of the second optical signal and a time period during which the transmission intensity of the second optical signal is maintained.

According to an embodiment of the disclosure, when the transmission intensity of the second optical signal is less than a predetermined value during a predetermined first time period, first synchronization information corresponding to the case may have "00". When the transmission intensity of the second optical signal is less than the predetermined value during a predetermined second time period, first synchronization information corresponding to the case may have "11". When the transmission intensity of the second optical signal is equal to or greater than the predetermined value during a predetermined third time period, first synchronization information corresponding to the case may have "01". When the transmission intensity of the second optical signal is equal to or greater than the predetermined value during a predetermined fourth time period, first synchronization information corresponding to the case may have "10".

For example, when the predetermined first time period is 1 ms and the first depth sensing apparatus 100 transmits a transmission intensity of the second optical signal that is less than the predetermined value from 0 ms to 1 ms, first synchronization information corresponding to the case may have a bit of "00". When the predetermined third time period is 3 ms and the first depth sensing apparatus 100 transmits a transmission intensity of the second optical signal that is equal to or greater than the predetermined value from 1 ms to 4 ms, first synchronization information corresponding to the case may have a bit of "01". Accordingly, the first synchronization information generated from 0 ms to 4 ms may have a bit value of "0001".

As shown in FIG. 6B, the first depth sensing apparatus 100 may transmit first synchronization information of "1011010001" to the at least one second depth sensing apparatus 200 by adjusting the transmission intensity of the second optical signal during the predetermined time period.

Figure 7A:
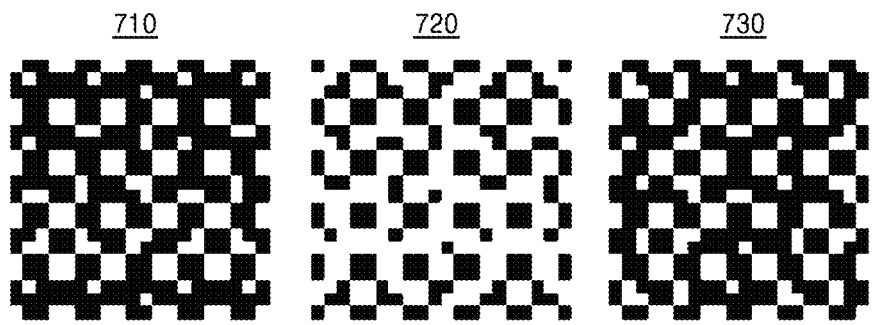
FIG. 7A is a diagram illustrating an embodiment in which a first depth sensing apparatus according to an embodiment of the disclosure transmits a second optical signal obtained by encoding first synchronization information.

FIG. 7A is a view illustrating an embodiment in which a first depth sensing apparatus according to an embodiment of the disclosure transmits the second optical signal obtained by encoding the first synchronization information.

According to an embodiment of the disclosure, the first depth sensing apparatus 100 may transmit the second optical signal to the object 50 in the form of projecting a predetermined image.

The first depth sensing apparatus 100 may store information about the predetermined image in a memory (not shown). For example, the first depth sensing apparatus 100 may store the information about the predetermined image as a table in the memory, and the information about the predetermined image and the first synchronization information may be matched with each other in a one-to-one correspondence.

As illustrated in FIG. 7A, a first image 710, a second image 720, and a third image 730 may be different types of images. The first image 710, the second image 720, and the third image 730 may be of predetermined pattern types. Information about the first image 710, the second image 720, and the third image 730 may be stored in the memory of the first depth sensing apparatus 100.

According to an embodiment of the disclosure, pieces of first synchronization information matched with the first image 710, the second image 720, and the third image 730, respectively, may be different pieces of synchronization information. For example, the first synchronization information matched with the first image 710 may be information about a first time point and a first cycle, the first synchronization information matched with the second image 720 may be information about a second time point and a second cycle, and the first synchronization information matched with the third image 730 may be information about a third time point and a third cycle.

FIG. 7B is a view illustrating an embodiment in which a first depth sensing apparatus according to an embodiment of the disclosure transmits the second optical signal obtained by encoding the first synchronization information.

According to an embodiment of the disclosure, the first depth sensing apparatus 100 may transmit the second optical signal to the object 50 in the form of projecting a predetermined image.

The first depth sensing apparatus 100 may store information about the predetermined image in the memory. For example, the first depth sensing apparatus 100 may store the information about the predetermined image as a table in the memory, and the information about the predetermined image and the first synchronization information may be matched with each other in a one-to-one correspondence.

As illustrated in FIG. 7B, a fourth image 740, a fifth image 750, and a sixth image 760 may be different types of images. The fourth image 740, the fifth image 750, and the sixth image 760 may be images each composed of alphabets. Information about the fourth image 740, the fifth image 750, and the sixth image 760 may be stored in the memory of the first depth sensing apparatus 100.

According to an embodiment of the disclosure, pieces of first synchronization information matched with the fourth image 740, the fifth image 750, and the sixth image 760, respectively, may be different pieces of synchronization information. For example, the first synchronization information matched with the fourth image 740 may be information about a fourth time point and a fourth cycle, the first synchronization information matched with the fifth image 750 may be information about a fifth time point and a fifth cycle, and the first synchronization information matched with the sixth image 760 may be information about a sixth time point and a sixth cycle.

Figure 8:
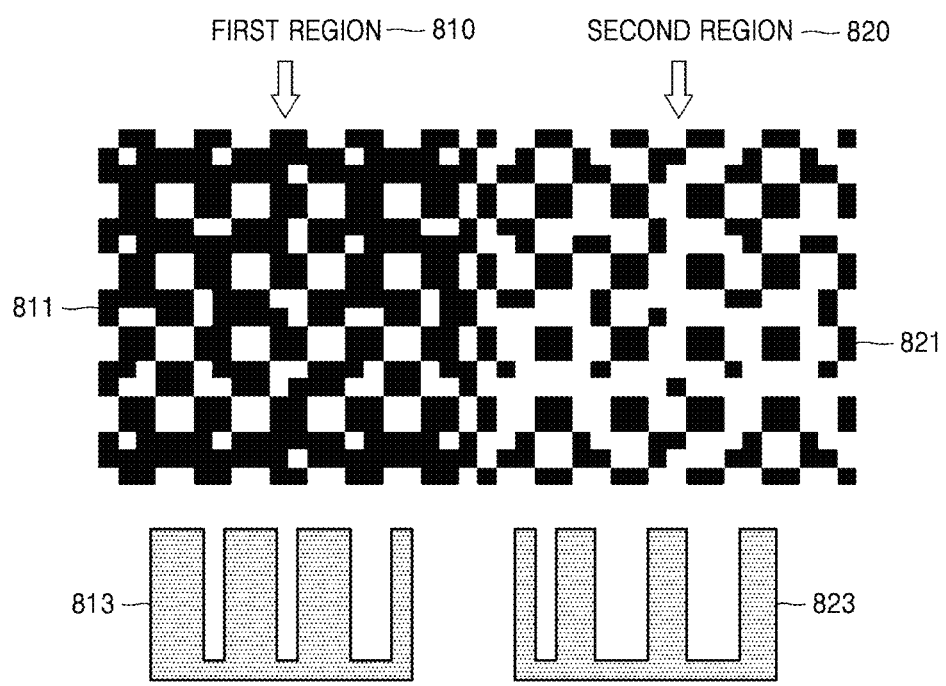
FIG. 8 is a diagram illustrating an embodiment in which a first depth sensing apparatus according to an embodiment of the disclosure transmits a second optical signal obtained by encoding first synchronization information.

FIG. 8 is a view illustrating an embodiment in which a first depth sensing apparatus according to an embodiment of the disclosure transmits the second optical signal obtained by encoding the first synchronization information.

According to an embodiment of the disclosure, the first depth sensing apparatus 100 may transmit the second optical signal by combining the method described above with reference to FIGS. 6A and 6B with the method described above with reference to FIGS. 7A and 7B.

A first region 810 according to an embodiment of the disclosure is an embodiment of encoding the first synchronization information by combining a first image 811 with a first optical signal intensity change 813, and a second region 820 according to an embodiment of the disclosure is an embodiment of encoding the first synchronization information by combining a second image 821 with a second optical signal intensity change 823.

Because more various bits may be generated when a method of utilizing an image is combined with a method of utilizing an optical signal intensity change, the first depth sensing apparatus 100 according to an embodiment of the disclosure may encode first synchronization information including more data. The first depth sensing apparatus 100 according to an embodiment of the disclosure may transmit many data to the at least one second depth sensing apparatus 200, through the second optical signal.

Figure 9:
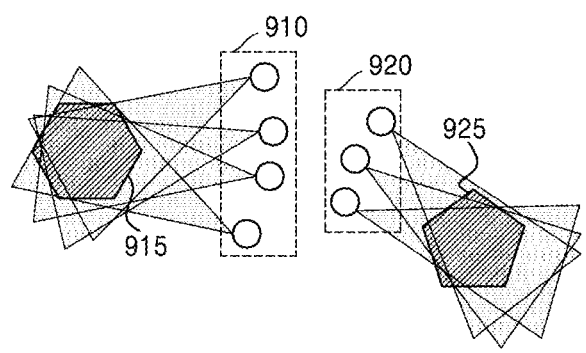
FIG. 9 is a schematic diagram for explaining a synchronization operation of depth sensing apparatuses, according to an embodiment of the disclosure.

FIG. 9 is a schematic diagram for explaining a synchronization operation of depth sensing apparatuses, according to an embodiment of the disclosure.

According to an embodiment of the disclosure, the synchronization operation of depth sensing apparatuses may be performed between depth sensing apparatuses that photograph the same object.

According to an embodiment of the disclosure, the depth sensing apparatuses included in a first group 910 may be depth sensing apparatuses that photograph a first object 915. The depth sensing apparatuses included in a second group 920 may be depth sensing apparatuses that photograph a second object 925.

Accordingly, in the related art, when the synchronization operation is performed through a network device separate from a depth sensing apparatus or performed through a wireless network, the first group 910 and the second group 920 may be unnecessarily incorporated and managed. However, according to an embodiment of the disclosure, an unnecessary grouping operation may be prevented, and only depth sensing apparatuses that require a synchronization operation may perform the synchronization operation. Thus, the depth sensing apparatuses according to an embodiment of the disclosure may perform a more efficient synchronization operation.

Figure 10:
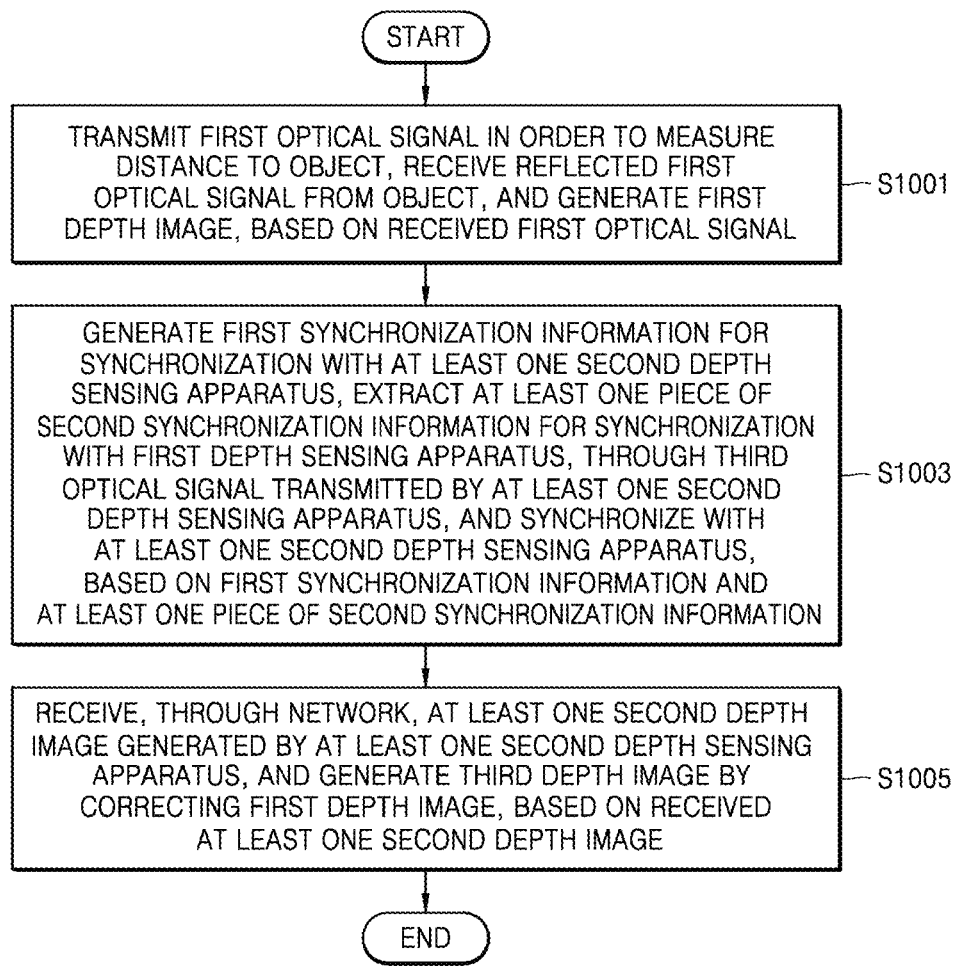
FIG. 10 is a flowchart of a depth image correction method according to an embodiment of the disclosure.

FIG. 10 is a flowchart of a depth image correcting method according to an embodiment of the disclosure.

In operation S1001, the first depth sensing apparatus 100 according to an embodiment of the disclosure may transmit a first optical signal in order to measure a distance to the object 50. The first depth sensing apparatus 100 according to an embodiment of the disclosure may receive a reflected first optical signal from the object 50. The first depth sensing apparatus 100 according to an embodiment of the disclosure may generate a first depth image, based on the received first optical signal. The operation S1001 of the first depth sensing apparatus 100 may be an operation of the first depth sensing apparatus 100 in the depth sensing mode. The depth sensing mode, which is an operation, performed by the first depth sensing apparatus 100, of generating a depth image of the object 50 by photographing the object 50, may refer to a general operation of the first depth sensing apparatus 100.

In operation S1003, the first depth sensing apparatus 100 according to an embodiment of the disclosure may generate first synchronization information for synchronization with the at least one second depth sensing apparatus 200. The first depth sensing apparatus 100 may extract at least one piece of second synchronization information for synchronization with the first depth sensing apparatus 100, through a third optical signal transmitted by the at least one second depth sensing apparatus 200. The first depth sensing apparatus 100 may synchronize with the at least one second depth sensing apparatus 200, based on the first synchronization information and the at least one piece of second synchronization information. The operation S1003 of the first depth sensing apparatus 100 may be an operation of the first depth sensing apparatus 100 in the synchronization mode. The synchronization mode, which is the operation of the first depth sensing apparatus 100 described above with reference to FIGS. 2 through 9, may refer to an operation of determining the time point when and the cycle during which to re-transmit the first optical signal in a relationship with the at least one second depth sensing apparatus 200.

In operation S1005, the first depth sensing apparatus 100 according to an embodiment of the disclosure may receive, through a network, at least one second depth image generated by the at least one second depth sensing apparatus, and may generate a third depth image by correcting the first depth image, based on the received at least one second depth image.

The first depth sensing apparatus 100 according to an embodiment of the disclosure may generate the first depth image by re-transmitting the first optical signal according to the depth sensing mode. At this time, according to a photographing situation of the first depth sensing apparatus 100, the quality of the first depth image may be degraded. For example, according to the location of the first depth sensing apparatus 100 photographing the object 50, when illumination to the object 50 is too excessive or too insufficient, the first depth image may be generated through inaccurate depth information about the object 50.

The first depth sensing apparatus 100 according to an embodiment of the disclosure may share the first depth image, and the at least one second depth image generated by the at least one second depth sensing apparatus 200, through a network according to a network mode. Connection of the first depth sensing apparatus 100 to the at least one second depth sensing apparatus 200 through a network may be performed according to user's settings or may be automatically performed according to the degree of degradation of the first depth image.

The first depth sensing apparatus 100 according to an embodiment of the disclosure may generate a third depth image by correcting the first depth image, based on the at least one second depth image. According to an embodiment of the disclosure, the first depth sensing apparatus 100 may generate the third depth image through a Simultaneous Localization and Mapping (SLAM) algorithm.

In detail, the SLAM algorithm may refer to an algorithm for performing location measurement and mapping simultaneously. The SLAM algorithm may include a localization process of finding its own location and a mapping process of registering an image. Accordingly, the first depth sensing apparatus 100 may generate the third depth image by correcting the first depth image, based on the at least one second depth image, through information about the location of the first depth sensing apparatus 100 and information about the location of the at least one second depth sensing apparatus 200.

Figure 11:
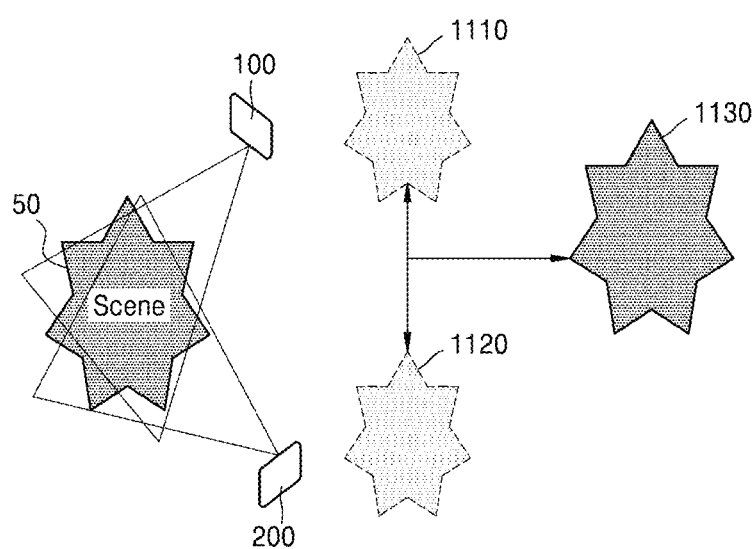
FIG. 11 is a schematic diagram for explaining a depth image correction operation of a first depth sensing apparatus, according to an embodiment of the disclosure.

FIG. 11 is a schematic diagram for explaining a depth image correction operation of a first depth sensing apparatus, according to an embodiment of the disclosure.

The first depth sensing apparatus 100 according to an embodiment of the disclosure may generate a first depth image 1110 by photographing the object 50, and the at least one second depth sensing apparatus 200 may generate at least one second depth image 1120 by photographing the object 50. The object 50 may be referred to as a scene that the first depth sensing apparatus 100 desires to photograph.

At this time, according to a photographing situation of the first depth sensing apparatus 100, the quality of the first depth image may be degraded. For example, according to the location of the first depth sensing apparatus 100 photographing the object 50, when illumination to the object 50 is too excessive or insufficient, the first depth image 1110 may be generated through inaccurate depth information about the object 50.

The first depth sensing apparatus 100 according to an embodiment of the disclosure may share the first depth image 1110, and the at least one second depth image 1120 generated by the at least one second depth sensing apparatus 200, through a network according to a network mode. Connection of the first depth sensing apparatus 100 to the at least one second depth sensing apparatus 200 through a network may be performed according to user's settings or may be automatically performed according to the degree of degradation of the first depth image 1110.

The first depth sensing apparatus 100 according to an embodiment of the disclosure may generate a third depth image 1130 by correcting the first depth image 1110, based on the at least one second depth image 1120. According to an embodiment of the disclosure, the first depth sensing apparatus 100 may generate the third depth image 1130 through the SLAM algorithm. The first depth sensing apparatus 100 may generate the third depth image 1130 by correcting the first depth image 1120, based on the at least one second depth image 1120, through information about the location of the first depth sensing apparatus 100 and information about the location of the at least one second depth sensing apparatus 200, which are obtained through the SLAM algorithm.

According to an embodiment of the disclosure, an operation of generating the third depth image 1130 may be performed by a server (not shown) other than a depth sensing apparatus. For example, the server may be a cloud server, and the server may be connected to the first depth sensing apparatus 100 and the at least one second depth sensing apparatus 200 through a network. The server may receive the first depth image 1110 from the first depth sensing apparatus 100 and the at least one second depth image 1120 from the at least one second depth sensing apparatus 200 to thereby generate the third depth image 1130 corresponding to a result of image correction. The server may re-transmit the third depth image 1130 to the first depth sensing apparatus 100.

Figure 12:
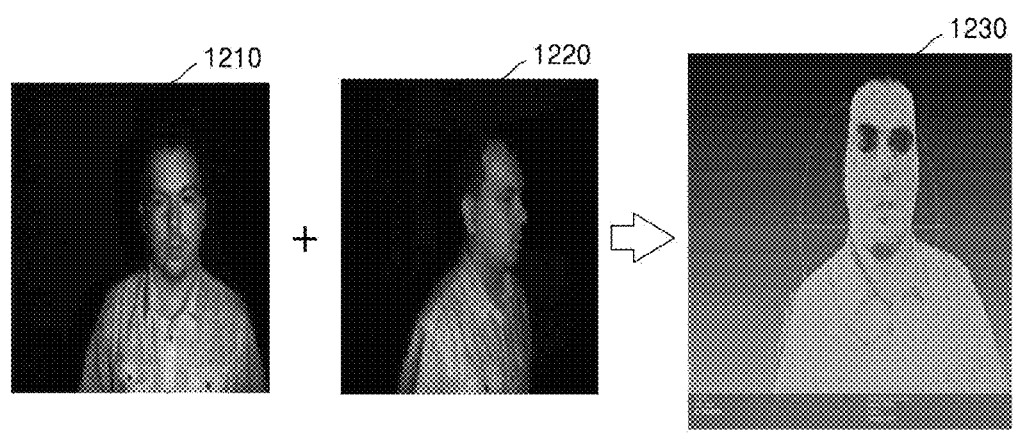
FIG. 12 is a diagram for explaining a result of a depth image correction operation of a first depth sensing apparatus, according to an embodiment of the disclosure.

FIG. 12 is a picture for explaining a result of a depth image correction operation of a first depth sensing apparatus, according to an embodiment of the disclosure.

FIG. 12 illustrates a third depth image 1230 generated through a first depth image 1210 generated by the first depth sensing apparatus 100 and at least one second depth image 1220 generated by the at least one second depth sensing apparatus 200.

The first depth sensing apparatus 100 according to an embodiment of the disclosure may generate the first depth image 1210 by photographing the object 50, and the at least one second depth sensing apparatus 200 may generate the at least one second depth image 1220 by photographing the object 50.

The first depth sensing apparatus 100 according to an embodiment of the disclosure may generate the third depth image 1230 by correcting the first depth image 1210, based on the at least one second depth image 1220. According to an embodiment of the disclosure, the first depth sensing apparatus 100 may generate the third depth image 1230 through the SLAM algorithm. The first depth sensing apparatus 100 may generate the third depth image 1230 by correcting the first depth image 1210, based on the at least one second depth image 1220, through information about the location of the first depth sensing apparatus 100 and information about the location of the at least one second depth sensing apparatus 200, which are obtained through the SLAM algorithm.

As shown in FIG. 12, the third depth image 1230 may have an improved depth than the first depth image 1210 and the at least one second depth image 1220.

Figure 13:
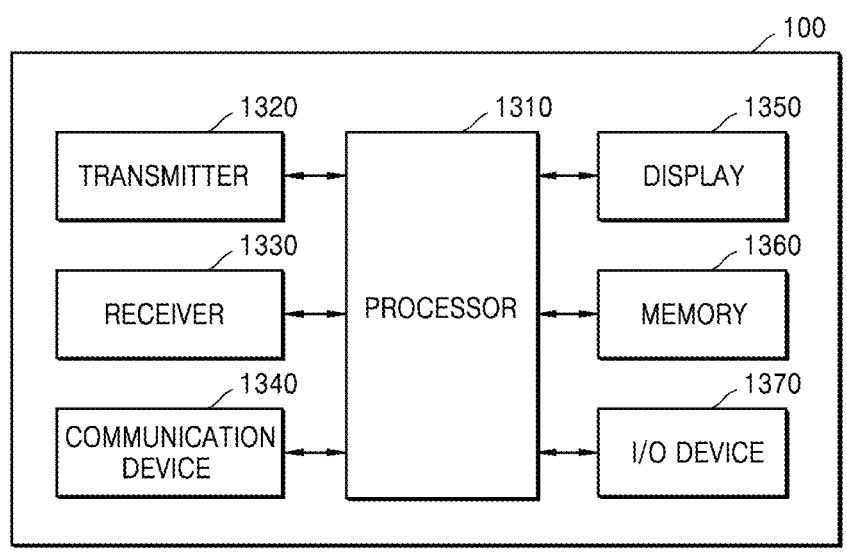
FIG. 13 is a block diagram of a structure of a first depth sensing apparatus according to an embodiment of the disclosure.

FIG. 13 is a block diagram of a structure of a first depth sensing apparatus according to an embodiment of the disclosure.

The first depth sensing apparatus 100 according to an embodiment of the disclosure may include a processor 1310, a transmitter 1320, a receiver 1330, a communication device 1340, a display 1350, a memory 1360, an input/output (I/O) device 1370, and a sensor (not shown).

The processor 1310 according to an embodiment of the disclosure may control each of the transmitter 1320, the receiver 1330, the communication device 1340, the display 1350, the memory 1360, and the I/O device 1370. The processor 1310 may include at least one of a central processing unit (CPU), an application processor (AP), or a communication processor (CP). The processor 1310 may control at least one component of an electronic device and/or execute an operation related to communication or a data process. Operations of the first depth sensing apparatus 100 may be controlled by the processor 1310.

The transmitter 1320 according to an embodiment of the disclosure may measure a distance between the first depth sensing apparatus 100 and the object 50 by using a supersonic sensor, an infrared sensor, a radio frequency (RF) sensor, or the like.

The infrared sensor may include a light-emitting device that outputs infrared light, and a light-receiving device that receives infrared light, converts the infrared light into an electrical signal, and outputs the electrical signal. The first depth sensing apparatus 100 has been described above as using an infrared sensor, but this is merely an embodiment. Various types of sensors such as a supersonic sensor and a laser sensor may be used.

The receiver 1330 according to an embodiment of the disclosure may be a CCD image sensor or CMOS image sensor having a one-dimensional or two-dimensional array. The receiver 1330 may recognize an optical signal transmitted by the transmitter 1320.

The communication device 1340 according to an embodiment of the disclosure may refer to a device for at least one of short-range wireless communication (for example, Bluetooth, Wi-Fi, or WiFi Direct) and long-range wireless communication (for example, GSM, UMTS, LTE, or WiBRO). In detail, the communication device 1340 may be implemented by being connected to an external device through a short-range communication network (for example, a Local Area Network (LAN)) and an Internet network or may be implemented by wireless communication (for example, RFID, NFC, Bluetooth, Wi-Fi, LTE, or WiBRO). The communication device 1340 may connect the first depth sensing apparatus 100 to the at least one second depth sensing apparatus 200. The first depth sensing apparatus 100 and the at least one second depth sensing apparatus 200 according to an embodiment of the disclosure may be directly or indirectly connected to the communication device 1340. A server (not shown) may be directly or indirectly connected to the first depth sensing apparatus 100 and the communication device 1340.

The display 1350 according to an embodiment of the disclosure may include a series of devices for displaying the state of the first depth sensing apparatus 100. The processor 1310 may display an operational state of the first depth sensing apparatus 100 by controlling the display 1350.

The memory 1360 according to an embodiment of the disclosure may include volatile and/or non-volatile memory. The memory 1360 may store, for example, a command or data related to at least one other component of the electronic device. According to an embodiment of the disclosure, the memory 1360 may store software and/or programs. The memory 1360 may include, for example, internal memory or external memory. The internal memory may include, for example, at least one selected from volatile memory (for example, dynamic RAM (DRAM), static RAM (SRAM), or synchronous dynamic RAM (SDRAM)) and non-volatile memory (for example, a one-time programmable read-only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD)). The external memory may include a flash drive, for example, a compact flash (CF), a secure digital (SD), a micro-SD, a mini-SD, a multi-media card (MMC), or a memory stick. The external memory may be functionally or physically connected to the electronic device via various interfaces.

The memory 1360 according to an embodiment of the disclosure may store one or more instructions for a depth sensing apparatus. The processor 1310 according to an embodiment of the disclosure may control an operation of the first depth sensing apparatus 100 by executing the one or more instructions stored in the memory 1360.

The I/O device 1370 according to an embodiment of the disclosure may be a device including devices that enables a user to interoperate with the first depth sensing apparatus 100. For example, the I/O device 1370 may be a device for controlling input/output interfaces such as a mouse, a keyboard, and a monitor. The processor 1310 may control the I/O device 1370 so that the user may interoperate with the first depth sensing apparatus 100.

The sensor (not shown) according to an embodiment of the disclosure may include an acceleration sensor, a gyroscope sensor, and at least one inertial measurement unit (IMU) for obtaining motion information of the first depth sensing apparatus 100. The IMU, which is a component that enters the interior of devices such as unmanned aerial vehicles (drones), airplanes, and satellites, refers to an integrated unit capable of measuring acceleration and rotation rate, namely, inertia, using an acceleration sensor and a gyroscope sensor and measuring movement in a 3D space. The first depth sensing apparatus 100 according to an embodiment of the disclosure may generate a third depth image by correcting degradation of a first depth image, through the sensor (not shown) and the SLAM algorithm.

Although various embodiments of the disclosure have been described in detail herein above, it should be understood that many variations and modifications may be made without departing from the spirit and scope of the disclosure as defined in the appended claims and their equivalents. Therefore, the scope of the disclosure is defined not by the detailed description of examples but by the appended claims and equivalents to the appended claims.

The block diagrams as described in the disclosure may be construed by one of ordinary skill in the art as conceptual representation of circuitry for implementing the principles of the disclosure. Similarly, it is also understood by one of ordinary skill in the art that any flowcharts, flow diagrams, state transitions, pseudo codes, etc., may be substantially embodied in a computer-readable medium as various processes that may be carried out by a computer or processor, whether or not the computer or the processor is explicitly shown. Accordingly, the aforementioned embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

Functions of the various elements shown in the drawings may be associated with appropriate software and thus may be provided by the use of dedicated hardware as well as hardware capable of executing the software. When provided by a processor, the functions may be provided by a single dedicated processor, a single shared processor, or a plurality of individual processors in which some of them may be shared. Also, the explicit use of the term "processor" or "controller" should not be interpreted as making exclusive reference to hardware capable of executing software, but may be construed as implicitly including, without limitation, digital signal processor (DSP) hardware, a ROM for storing software, a RAM, and a non-volatile storage device.

In the attached claims of the disclosure, an element represented as a unit for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intend that particular properties, structures, features, etc., are included in at least one embodiment of the principle of the disclosure. Thus, the term "an embodiment" and any other modifications provided in the specification do not necessarily refer to the same embodiment of the disclosure.

Throughout the disclosure, the expression "at least one of a or b" indicates only a, only b, both a and b. Additionally, throughout the disclosure, the expression "at least one of a, b or c" indicates only a, only b, only c, both a and b, both a and c, both b and c, all of a, b, and c, or variations thereof. Even when more or less items are enumerated, they may be clearly and expansively interpreted by one of ordinary skill in the art.

The disclosure has been particularly shown and described with reference to exemplary embodiments thereof.

It is to be understood that all embodiments of the disclosure and conditional exemplification as disclosed in the specification are intended to assist one of ordinary skill in the art in understanding the principles and concepts of the disclosure, and thus one of ordinary skill in the art may understand that the embodiments of the disclosure may be modified without departing from the substantial characteristics of the disclosure. Thus, the disclosed embodiments should be considered in a descriptive sense only and not for purposes of limitation. The scope of the disclosure is defined not by the detailed description but by the appended claims, and all differences within the scope will be construed as being included in the disclosure.

The invention claimed is:

1. A synchronization method of a first depth sensing apparatus, the synchronization method comprising:
    transmitting a first optical signal to measure a distance to an object;
    receiving the first optical signal reflected by the object;
    when recognition of the received first optical signal fails, stopping transmission of the first optical signal and generating first synchronization information for synchronization with at least one second depth sensing apparatus;
    receiving a third optical signal for synchronization with the first depth sensing apparatus, which is transmitted by the at least one second depth sensing apparatus,
    decoding the received third optical signal to extract at least one piece of second synchronization information;
    determining a time point at which and a cycle in which to re-transmit the first optical signal, based on the first synchronization information and the at least one piece of second synchronization information; and re-transmitting the first optical signal at the determined time point and cycle.

2. The synchronization method of claim 1, wherein the receiving of the third optical signal comprises receiving the third optical signal during a predetermined time period starting from a time point when recognition of the received first optical signal fails.

3. The synchronization method of claim 1, wherein the determining of the cycle in which to re-transmit the first optical signal comprises determining the cycle to re-transmit the first optical signal, based on the number of the at least one second depth sensing apparatus.

4. The synchronization method of claim 3, wherein the cycle in which to re-transmit the first optical signal is a result of dividing a predetermined re-transmission period by the sum of the number of pieces of first synchronization information and the number of the at least one piece of second synchronization information.

5. The synchronization method of claim 1, further comprising transmitting a second optical signal obtained by encoding the first synchronization information.

6. The synchronization method of claim 5, wherein the determining of the time point when to re-transmit the first optical signal comprises determining the time point at which to re-transmit the first optical signal, by comparing a time point at which the second optical signal has been transmitted with a time point at which the third optical signal has been received.

7. The synchronization method of claim 6, wherein the determining of the time point at which to re-transmit the first optical signal comprises
determining a predetermined first time point as the time point at which to re-transmit the first optical signal, when the first depth sensing apparatus does not receive the third optical signal, based on the time point at which the second optical signal has been transmitted, and
when the first depth sensing apparatus does receive the third optical signal, based on the time point at which the second optical signal has been transmitted, determining a predetermined second time point as the time point at which to re-transmit the first optical signal, based on the number of received third optical signals.

8. The synchronization method of claim 5, wherein the determining of the time point at which and the cycle in which to re-transmit the first optical signal comprises determining the time point at which and the cycle in which to re-transmit the first optical signal, based on third synchronization information transmitted by a master device determined from among the first depth sensing apparatus and the at least one second depth sensing apparatus according to a predetermined master determination rule.

9. The synchronization method of claim 8, wherein the predetermined master determination rule is a rule in which the first depth sensing apparatus is determined as the master device when the time point at which the second optical signal has been transmitted is earlier than the time point at which the third optical signal has been received.

10. The synchronization method of claim 8, wherein the third synchronization information is information about a time point at which and a cycle in which to re-transmit the first optical signal and a time point at which and a cycle in which the second depth sensing apparatus transmits a fourth optical signal to measure a distance to the object.

11. The synchronization method of claim 5, wherein the transmitting of the second optical signal comprises transmitting the second optical signal by changing a transmission intensity of the second optical signal according to time.

12. The synchronization method of claim 5, wherein the transmitting of the second optical signal comprises transmitting the second optical signal in a form of projecting a predetermined image on the object.

13. A first depth sensing apparatus comprising:
a transmitter configured to transmit a first optical signal to measure a distance to an object;
a receiver configured to receive the first optical signal reflected by the object;
a memory storing at least one instruction; and
a processor configured to execute the at least one instruction,
wherein the processor executes the at least one instruction to:
when recognition of the received first optical signal fails, stop transmission of the first optical signal and generate first synchronization information for synchronization with at least one second depth sensing apparatus,
the receiver is further configured to receive a third optical signal for synchronization with the first depth sensing apparatus, which is transmitted by the at least one second depth sensing apparatus,
the processor extracts at least one piece of second synchronization information by decoding the received third optical signal,
determines a time point at which and a cycle in which to re-transmit the first optical signal, based on the first synchronization information and the at least one piece of second synchronization information, and
the transmitter re-transmits the first optical signal at the determined time point and cycle.

14. The first depth sensing apparatus of claim 13, wherein the reception of the third optical signal comprises receiving the third optical signal during a predetermined time period starting from a time point at which recognition of the received first optical signal fails.

* * * * *